United States Patent [19]

Sollogoub

[11] Patent Number: 4,975,307

[45] Date of Patent: Dec. 4, 1990

[54] TRANSLUCENT LAMINATED PANEL

[76] Inventor: Nicolas Sollogoub, 4780 Côte des Neiges, Montreal, Canada, H3V 1V2

[21] Appl. No.: 313,043

[22] Filed: Feb. 21, 1989

Related U.S. Application Data

[63] Continuation-in-part of Ser. No. 174,906, Mar. 29, 1988, abandoned.

[51] Int. Cl.5 ............................ E06B 3/24; E04C 2/54
[52] U.S. Cl. ......................................... 428/34; 428/38; 428/49; 428/143; 428/166; 428/167; 428/192; 428/210; 428/426; 428/428; 52/733; 52/789
[58] Field of Search ................... 428/34, 38, 192, 167, 428/166, 122, 415–417, 426, 410, 542.2, 543; 156/107, 109; 52/788, 789, 790, 783, 286; 428/46, 47, 49, 54, 55, 79, 141, 143, 413, 414, 420, 428, 210

[56] References Cited

U.S. PATENT DOCUMENTS

| | | | |
|---|---|---|---|
| 3,547,766 | 12/1970 | Chu | 428/38 |
| 3,563,821 | 2/1971 | Turtaud | 428/38 |
| 4,318,946 | 3/1982 | Pavone | 428/38 |

Primary Examiner—Ellis P. Robinson
Assistant Examiner—Donald J. Loney
Attorney, Agent, or Firm—Pierre Lespérance

[57] ABSTRACT

A translucent laminated article comprised of an acrylic sheet spacedly located between a front and a rear protective sheet, the latter two being made of transparent window glass. The article further includes intermediate laminations of glass pieces bonded on the inner surface of each of the front and rear protective sheets, respectively. The acrylic sheet is frosted and/or grooved. An effect of perspective is obtained.

3 Claims, 2 Drawing Sheets

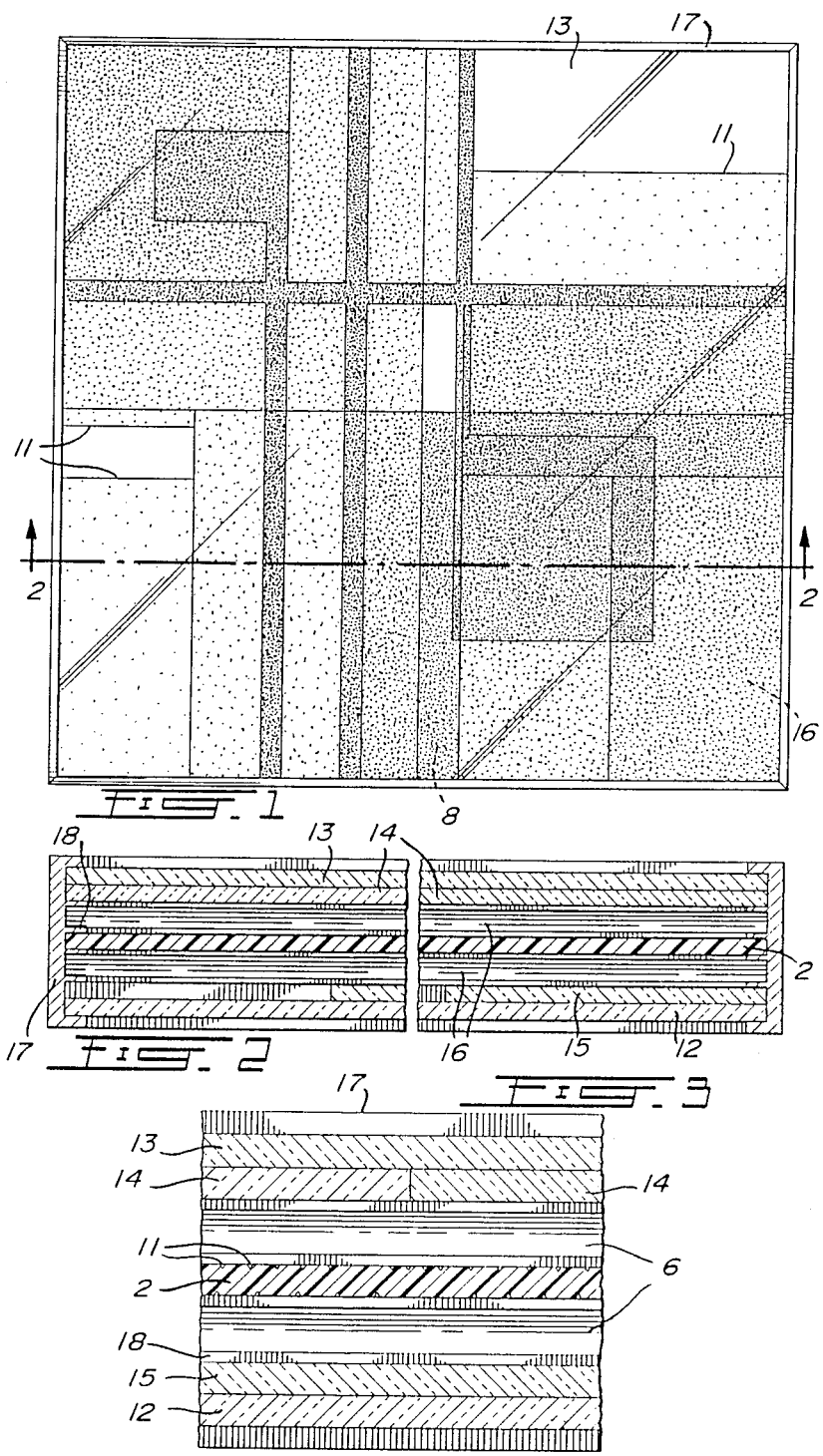

TRANSLUCENT LAMINATED PANEL

This is a continuation-in-part of application Ser. No. 174,906, filed Mar. 29, 1988, abandoned.

FIELD OF THE INVENTION

The present invention relates generally to decorative glass panels.

BACKGROUND OF THE INVENTION

The old art of stained glass window making is valued for the effect of illuminated colour it gives to images and, more recently, to abstract representation. Yet as beautiful as a stained glass window may be, its intended effect is somewhat limited. The same holds true for simulated stained glass where the glass is replaced by plastic pieces and/or sheets. The limitation consists in the structure of a stained glass window or simulation the visual experience is two-dimensional, even for multi-layered simulations, such as the invention disclosed in the U.S. Patent issued to Lecoeur et al on Feb. 24, 1976 and bearing number 3,940,523. Moreover, the translucent quality and effect of such windows does not change from natural daylight to artificial illumination at night.

OBJECTS OF THE INVENTION

In view of the above, it is therefore a prime object of the present invention to provide aesthetic laminated sheets which create a different effect as a function of the direction of light passing through, and/or the angle at which one views the sheets.

It is another equally-important object of the present invention to provide sheets of the above type, which create an effect of depth when viewed.

It is a further object of the present invention to provide laminated sheets of the above type, which are very strong and non-costly to produce.

SUMMARY OF THE INVENTION

The above and other objects and advantages of the present invention are realized according to a preferred embodiment comprising a sheet of organic acrylic glass, preferably polymethyl methacrylate, better known by the trademark "PLEXIGLASS".

One or both planar surfaces of the acrylic sheet are marked or cut in any desired way to form grooves. Such grooves make take the form of straight lines or curves according to a selected design. Also, one or both planar surfaces may be partially frosted and have applied colour gradations. A further treatment contemplated involves using transparent acrylic paint to tint portions of, or all of, one or both surfaces of the sheet. The acrylic sheet is placed between said spaced from both a rear protective sheet and a front protective sheet, both made of ordinary inorganic window glass.

A plurality of coloured glass pieces, of any desired colour, are glued as an intermediate lamination to the inside of the front sheet. Similarly, a second intermediate lamination, of coloured glass pieces, are glued to the inside face of the rear sheet. The whole is held together by being mounted in a suitable frame.

The combined visual effect of the laminated sheets, treated as described above, is novel and beautiful and has not been hitherto possible.

BRIEF DESCRIPTION OF THE DRAWINGS

The above will be more clearly understood by referral to the preferred embodiment of the invention illustrated by way of the accompanying drawings, in which:

FIG. 1 is a top plan view of an embodiment of laminated sheets according to the invention;

FIG. 2 is a sectional view taken along lines 2—2 of FIG. 1;

FIG. 3 is an enlarged view of a portion of the view of FIG. 2; and

Like numerals indicate like elements throughout the drawings.

DETAILED DESCRIPTION OF THE PREFERRED EMBODIMENT

Figure 4:
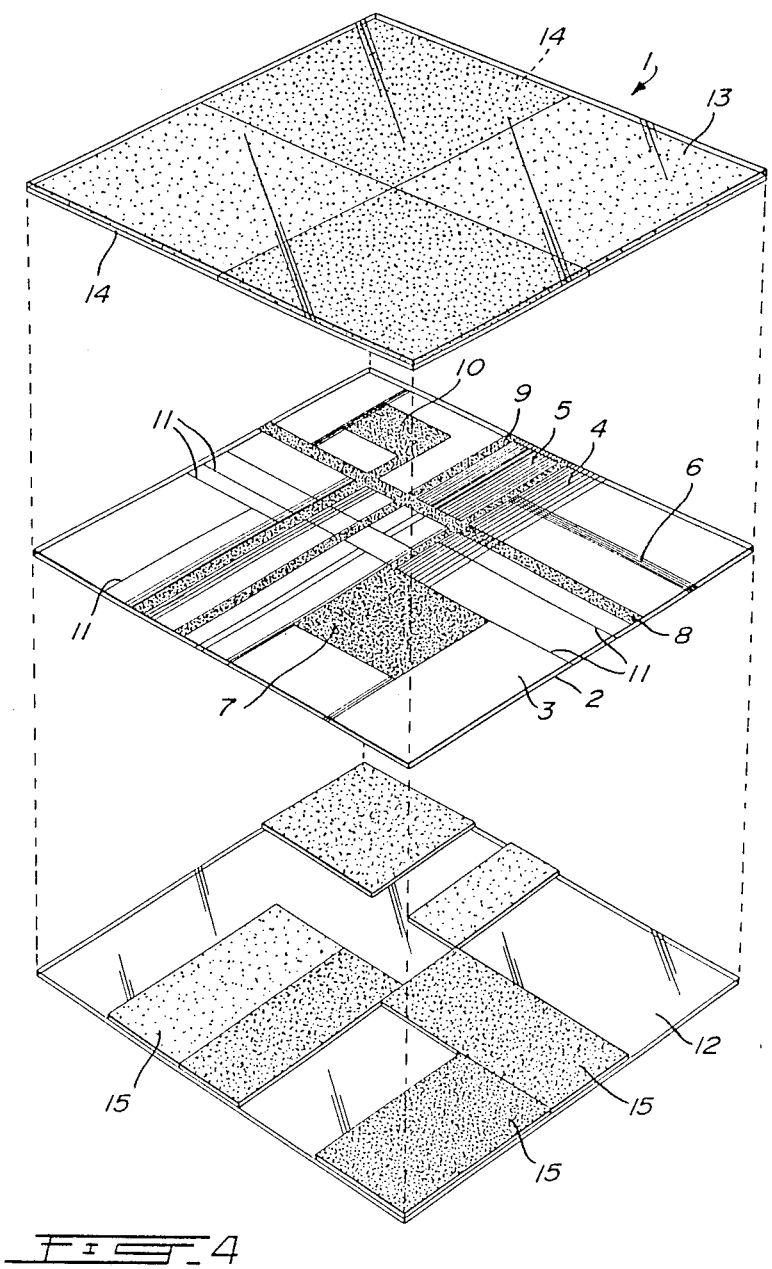
FIG. 4 is an exploded perspective view of the laminated sheets of FIG. 1.

Referring firstly to FIG. 4, there is shown an exploded view of the laminated sheets 1. Sheets 1 include a plastic acrylic sheet 2, preferably made of "plexiglass", as described above. Sheet 2 may be square, as shown, or of any other shape.

Sheet 2 thus defines a front planar surface, indicated at 3, and a rear planar surface (not seen in the figures).

One or both of these planar surfaces may be at least partially frosted as at 4, 5, and 6. Colour gradations, as at 7, 8, 9, and 10, can be added to one or both planar surfaces.

To achieve a design, such as an abstract one as shown in the figures or a pictorial design, plexiglass sheet 2 is further treated by making various marks or cuts 11, or grooves (see FIG. 3); in both planar surfaces. Such grooves have a light diffracting action. Further treatments still consists of tinting sheet 2 on one or both planar surfaces with acrylic paint, preferably of gold or silver.

Plexiglass sheet 2 is protected by a protective rear sheet 12 and a front sheet 13. Both the latter are made of ordinary, not coloured, transparent inorganic window glass.

FIG. 3 shows the first and second intermediate laminations 14, 15 glued by a transparent glue to the inside surface of the front glass sheet 13 and of the rear glass sheet 12, respectively. Laminations 14, 15 are made up of a plurality of directly-abutting, coloured glass pieces which may be rectangular or square, as shown, it being understood that any shape of piece may be used. An air space 16 is formed on each side of sheet 2. A frame 17, which may be made of extruded aluminum bar with retaining lips 18, surrounds and holds the assembly of sheets.

The three laminations 2, 14, and 15 create an effect of dimension and depth which varies with the angle of sight due to the grooved design viewed through air space 16 and through coloured glass pieces 14 or 15, with the other pieces 15 or 14 as a background.

What I claim is:

1. A translucent laminated article comprising:
   (a) a transparent acrylic plastic sheet, defining first and second planar surfaces, with at least one of said surfaces being provided with groove-forming cuts;
   (b) a first protective, transparent, rigid glass sheet;
   (c) first securing means to fixedly spacedly interconnect said acrylic sheet first surface to said first protective sheet in respective register to each other and in substantially parallel fashion with an air spacing there between, wherein said first protective sheet defines an inner face on the side of the acrylic sheet;

(d) a second protective, transparent, rigid glass sheet;

(e) second securing means, to fixedly spacedly interconnect said acrylic sheet second surface to said second protective sheet in respective register with each other and in substantially parallel fashion with an air spacing there between, wherein said second protective sheet defines an inner face on the side of said acrylic sheet;

(f) a first lamination, to be applied flatly against said first protective sheet inner face, and consisting of differently colored, transparent integral glass pieces;

(g) first bonding means, anchoring said first lamination flatly directly against said first protective sheet inner face;

(h) a second lamination, to be applied flatly against said second protective sheet inner face, and consisting of differently colored, transparent integral glass pieces; and (i) second bonding means, anchoring said second lamination flatly directly against said second protective sheet inner face; wherein the laminated article creates an effect of dimension and depth which varies with the angle of sight due to the grooved design viewed through the air spacings between the acrylic sheet and the two said laminations including said colored glass pieces.

2. A laminated article as in claim 1, wherein at least one of said acrylic sheet surfaces is at least partially frosted.

3. A laminated article as in claim 1, wherein each of said acrylic sheet surfaces is provided with groove-forming cuts and each of the latter surfaces has frosted zones.

* * * * *